Apr. 24, 1923.
A. C. STEWART
1,452,622
VALVE FOR INTERNAL COMBUSTION ENGINES
Filed May 3, 1920 2 Sheets-Sheet 1
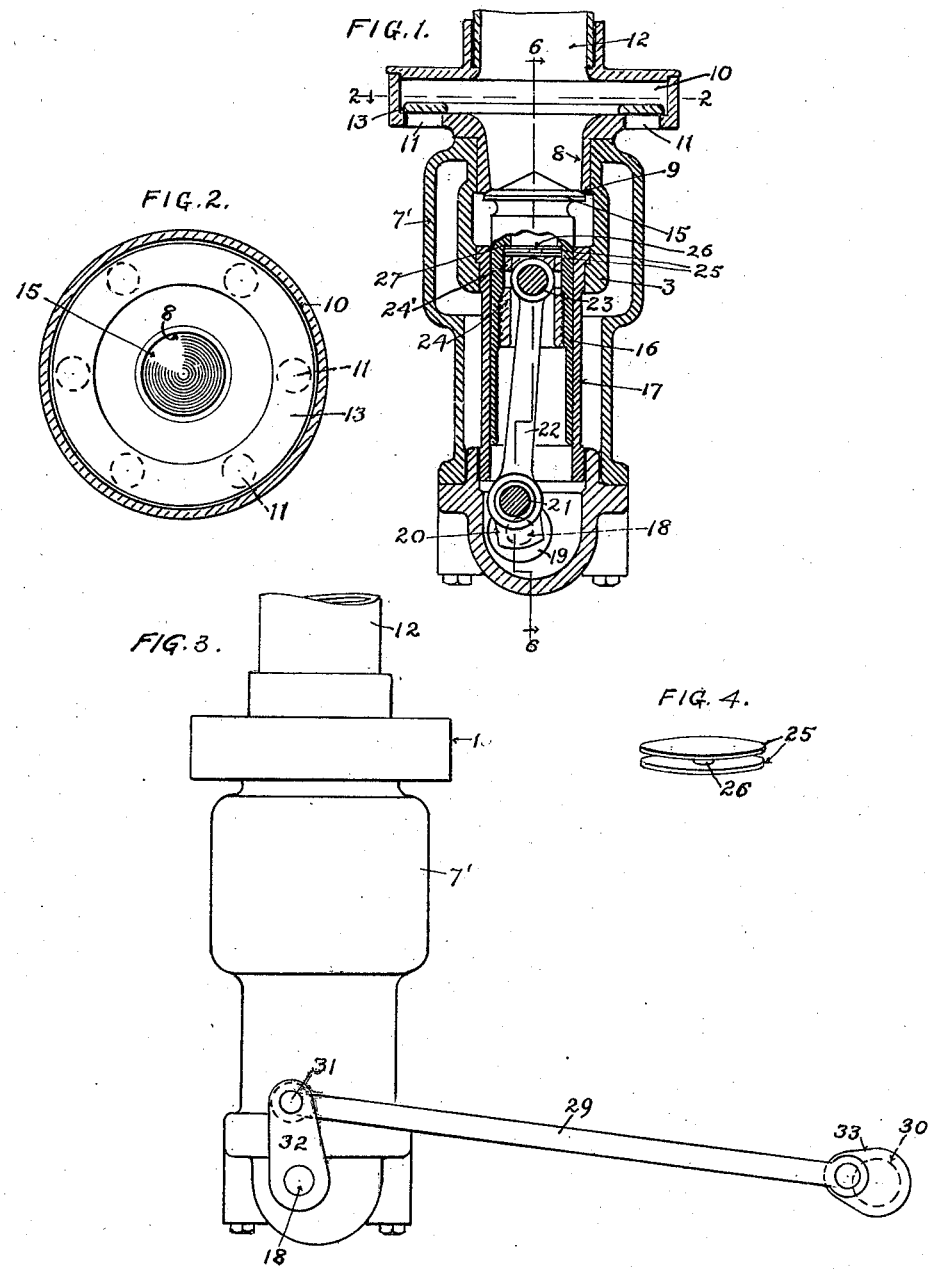
INVENTOR
Alfred C. Stewart
BY
Arthur P. Knight
ATTORNEY Apr. 24, 1923.　　　　　　　　　　　　　　　　　　1,452,622
A. C. STEWART
VALVE FOR INTERNAL COMBUSTION ENGINES
Filed May 3, 1920　　　　　2 Sheets-Sheet 2

INVENTOR
Alfred C. Stewart
BY
Arthur P. Knight
ATTORNEY

Patented Apr. 24, 1923.

1,452,622

UNITED STATES PATENT OFFICE.

ALFRED C. STEWART, OF LOS ANGELES, CALIFORNIA.

VALVE FOR INTERNAL-COMBUSTION ENGINES.

Application filed May 3, 1920. Serial No. 378,499.

*To all whom it may concern:*

Be it known that I, ALFRED C. STEWART, a citizen of the United States, residing at Los Angeles, in the county of Los Angeles and State of California, have invented a new and useful Valve for Internal-Combustion Engines, of which the following is a specification.

This invention relates to a valve for controlling the operatiton of the working cylinder of an internal combustion engine, and the main object of the invention is to provide a valve adapted to act both as an intake and exhaust valve.

Another object of the invention is to provide an intake or exhaust valve having means for positive operation thereof, as distinguished from the usual cam operated valves.

The accompanying drawings illustrate embodiments of my invention, and referring thereto:

Fig. 1 is a vertical section of the valve;

Fig. 2 is a horizontal section on line 2—2 in Fig. 1;

Fig. 3 is a side elevation of the valve and operating connections therefor;

Fig. 4 is a perspective view of an elastic washer for the valve;

Figure 5:
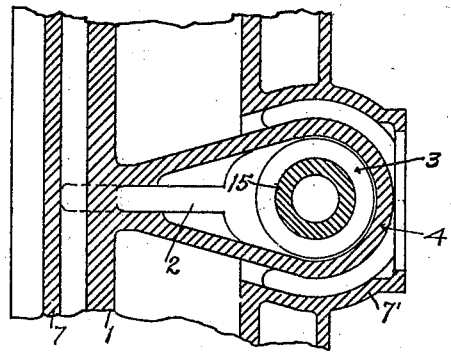
Fig. 5 is a horizontal section of the valve on line 5—5 in Fig. 6.
Figure 6:
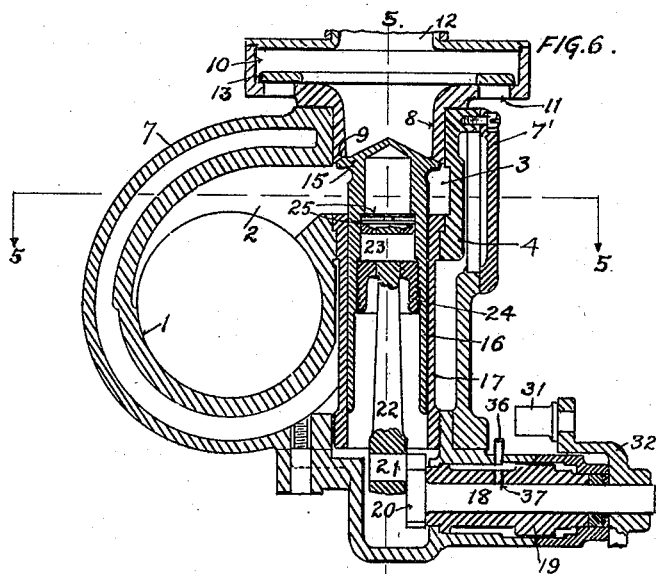
Fig. 6 is a vertical section on line 6—6 in Fig. 1.

In Figs. 1 to 5 is illustrated a form of the invention particularly adapted for use with internal combustiton engines of the Diesel type wherein the fuel is injected separately from the air, the air being drawn into the cylinder and compressed to a high pressure and temperature, and the fuel being injected during the expansion stroke. As hereinafter explained, however, my invention is not limited to this type of engine.

1 indicates a cylinder of an internal combustion engine having a port 2 opening thereinto and communicating with a valve chamber 3 formed in an extension 4 of the cylinder, said port 2 preferably extends tangentially to the cylinder so that incoming air sweeps over the entire space between the passage and the cylinder head thereby avoiding the formation of eddies or pockets. Suitable water jacket means, indicated at 7 and 7', are provided for the cylinder and the valve.

Valve chamber 3 is provided with tubular passage means 8 having a valve seat 9 at its inner end and opening into an inlet chamber 10, which is provided with openings or ports 11 for admission of air, said passage 8 serves as an air inlet passage during the intake stroke and as an exhaust passage during the exhaust stroke. An exhaust opening 12 extends from the chamber 10 and in alinement with the tubular passage means 8 in such manner that the exhaust gases issuing from the valve will be directed by the passage means 8 into and through the exhaust opening or pipe 12. A valve ring or closure means 13 may be provided for normally closing the openings 11 aforesaid, said valve resting on the bottom of the chamber 10 by its own weight and being raised by the upward pressure of the air thereon when suction is produced in the chamber 10 in the admission stroke of the engine.

A valve 15 is adapted to engage the valve seat 9 aforesaid to close the valve opening and is provided with a tubular stem 16 sliding in a tubular guide 17 mounted in the casing 3, so that the valve is movable vertically to open and close the valve. Said valve is preferably operated by the rock shaft 18 mounted in a bearing 19 at the bottom of the valve casing and connected to the valve by a crank 20 on said shaft carrying a pivotal connection 21 to a link or connecting rod 22 which carries at its upper end a wrist pin 23 pivotally engaging a bushing 24 screwed into the valve stem 16 and also pivotally engaging, by its upper face, a plunger 24', which is adapted to slide vertically within the tubular valve stem 16 aforesaid, a yielding washer, or equivalent yielding device, being interposed between the plunger 24' and the valve stem to enable a slight further upward movement of the pin when the movement of the valve is arrested by reason of its contacting with seat 9, so as to insure effective closure of the valve. Said yielding washer may consist of disks 25 of suitable resilient material, such as thin metal, connected by a central stud 26, the lower disk 25 engaging peripherally with the top of the plunger 24', and the upper disk 25 engaging peripherally with an internal shoulder 27 on the valve 15. Rock shaft 18 may be operated in any suitable manner, for example, by a rod 29 (see Fig. 3) connected by a pivot 31 to arm 32 on said shaft and by crank 33 to a rotative shaft 30, which may be the ordinary "two-to-one," or one-half speed shaft which ordinarily carries the cams for operation of the valves, the arrangement of the parts being such that the valve 15 is opened at the beginning of the exhaust stroke and remains open during the intake stroke which follows immediately after the exhaust stroke.

The operation is as follows:

In normal condition the valve 13 is closed and the valve 15 is also closed except when opened during the exhaust and intake strokes. At the beginning of each intake or admission stroke valve 15 is opened by operation of the shaft 30 operating through parts 29, 32, 18 and 22, and air is drawn through the inlet passage 8, valve chamber 3 and port 2 to the cylinder 1. Valve 15 then closes and remains closed during the succeeding compression and expansion strokes. In said expansion stroke fuel is admitted or injected to the cylinder in the usual manner to effect combustion in such expansion stroke. In the succeeding scavenging or exhaust stroke the valve 15 is again opened by the operation of shaft 20 and the exhaust gases pass from the cylinder 1 through port 2, chamber 3 and passage 8 and out through the opening or exhaust pipe 12. The momentum of such exhaust gases passing through the opening or pipe 12 is sufficient to prevent such gases from being drawn back into the chamber 10 after they have left same. The valve 15 remains open in the next intake stroke and air is then drawn in through the passage 8, such air being drawn through the openings 11, valve 13 being lifted, if such valve is used. In some cases, this valve 13 may be dispensed with, ports or openings 11 being permanently open. The inlet chamber 10 extends laterally with respect to the air inlet passage 8, so that air is admitted from said chamber to said passage laterally with respect to the direction of the passage, whereas the exhaust connection is in line with said passage. The outgoing exhaust gases therefore do not interfere with the admission of the air from the air inlet means which is lateral to the direction of flow of such exhaust gases. It will be noted that the valve 15 is wide open at the beginning of the intake stroke thereby preventing wire-drawing and ensuring effective admission of air.

At each closing operation of valve 15 the valve is enabled to make a uniform and effective closure against its seat by reason of its yielding connection, the plunger 24' pressing against the lower disk 25 and this pressure being transmitted through the stud 26 and upper disk 25 to the body of the valve 15 so as to press the valve home and ensure tight closure without the liability of straining the parts.

Figure 7:
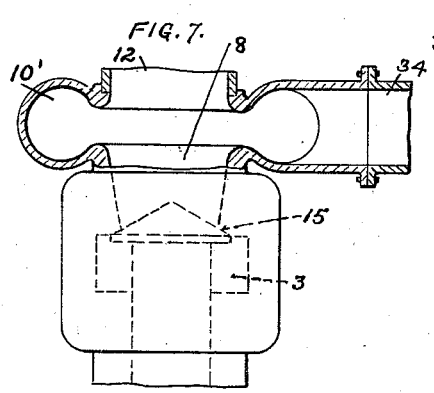
Fig. 7 is a partly sectional side elevation of a modified form of the valve.

In applying my invention to an internal combustion engine of the usual type in which explosive mixture of air and fuel is drawn in during each intake stroke the construction shown in Fig. 7 may be adopted, the inlet chamber 10' communicating with the inlet valve chamber 3 through the passage 8 being connected to a pipe or conduit 34 leading to a carbureter or other source of combustible or explosive mixture of fuel and air. In other respects the construction and operation may be the same as above described. It will be understood therefore that the expression "air admission means", as herein used, includes means for admitting air together with fuel, or air alone, according to the type of engine with which the device is used.

By the above described valve construction I provide for positive operation of the valve in opening by the reciprocating means 16, operated by rotative means 18, which is operated by the engine at half the engine speed, and at the same time provide for holding the valve closed by such operation during a considerable interval of time, namely, during the compression and expansion strokes, in a manner that would not otherwise be possible in connection with positive operation.

The parts may be lubricated in any suitable manner, for example, by supplying oil through passages 36 and 37 to bearing of shaft 18, whence it passes to the interior of the member 17 to lubricate the same.

What I claim is:

1. In combination with a cylinder of an internal combustion engine, a valve chamber communicating with said cylinder and having an inlet and exhaust passage, a valve controlling said passage and provided with operating means for opening the valve during the exhaust stroke and the succeeding intake stroke, an exhaust passage opposite the aforesaid passage and in line therewith to receive the exhaust gases therefrom when the valve is opened in the exhaust stroke, and an admisison means for admitting air to said inlet and exhaust passage, said air admitting means being arranged to deliver the air laterally with respect to the said inlet and exhaust passage means, so that the incoming air is not interfered with by the outgoing exhaust gases.

2. In an internal combustion engine, the combination of an engine cylinder provided with a single passage means for intake and exhaust, an exhaust connection leading directly from and in line with said passage means, an intake connection leading to said passage means in a direction transverse to the flow of exhaust gases from said passage means, a valve controlling said passage means, a shaft operated positively by the engine, a reciprocating member operated by said shaft and a resilient means interposed between said reciprocating member and said valve, the construction adapted to hold the valve closed continuously during the compression and expansion strokes and open continuously during the exhaust and intake strokes.

In testimony whereof I have hereunto subscribed my name this 21st day of April, 1920.

ALFRED C. STEWART.